United States Patent
Adachi et al.

(10) Patent No.: US 6,508,116 B1
(45) Date of Patent: Jan. 21, 2003

(54) WATER BIKE EQUIPPED WITH SPEED METER

(75) Inventors: Atsushi Adachi, Shizuoka-ken (JP);
Genuemon Fujita, Shizuoka-ken (JP);
Haruhito Matsushita, Hamamatsu (JP);
Hiroshi Kohiruimaki, Hamamatsu (JP);
Kazuyuki Suzuki, Fukuroi (JP);
Yoshitaka Amata, Nagoya (JP)

(73) Assignees: Act System Co., Ltd., Hamamatsu (JP);
Aichi Tokei Denki Co., Ltd., Nagoya (JP)

( * ) Notice: Subject to any disclaimer, the term of this patent is extended or adjusted under 35 U.S.C. 154(b) by 0 days.

(21) Appl. No.: 09/585,317

(22) Filed: Jun. 2, 2000

(30) Foreign Application Priority Data

Oct. 5, 1999 (JP) ............................................. 11-283811

(51) Int. Cl.[7] .................................................. G01P 5/08
(52) U.S. Cl. .................................. 73/170.02; 73/514.39
(58) Field of Search .......................... 73/861.08, 861.11, 73/861.12, 181, 170.02, 170.03, 514.39; 324/163, 166, 167, 173, 174

(56) References Cited

U.S. PATENT DOCUMENTS

| | | | |
|---|---|---|---|
| 3,531,988 A | | 10/1970 | Casani et al. |
| 3,677,082 A | * | 7/1972 | Springston, Jr. et al. ...... 73/181 |
| 5,357,794 A | * | 10/1994 | Nielsen ........................ 73/181 |
| 5,581,515 A | * | 12/1996 | Masreliez ..................... 367/89 |
| 5,838,635 A | * | 11/1998 | Masreliez ..................... 367/89 |

FOREIGN PATENT DOCUMENTS

| | | |
|---|---|---|
| JP | 7-156871 | 6/1995 |
| JP | 6-263089 | 7/1995 |

* cited by examiner

*Primary Examiner*—Harshad Patel
*Assistant Examiner*—Corey D. Mack
(74) *Attorney, Agent, or Firm*—Connolly Bove Lodge & Hutz LLP

(57) ABSTRACT

A water bike equipped with a speed meter wherein a speed meter sensor 1 including a coil for generating a magnetic flux and electrodes disposed at positions vertical to both flowing direction of a fluid and direction of the magnetic flux, and for measuring the speed of the water bike on water by the value of electromotive force generated by an electromagnetic induction operation, is fitted to a submerged portion of the water bike 2.

13 Claims, 6 Drawing Sheets

DIRECTION OF ELECTRIC FIELD ↕
⊙ A DIRECTION OF WATER FLOW
DIRECTION OF MAGNETIC FLUX ↔

WATER BIKE EQUIPPED WITH SPEED METER

BACKGROUND OF THE INVENTION

This invention relates to a water bike equipped with a speed meter.

A vane wheel type sensor has been wide spread in the past as a sensor of a water bike (that is also called a "personal water craft") for detecting a running speed of the water bike on water. This vane wheel type sensor includes a vane wheel that is so fitted to the bottom of the water bike as to protrude therefrom. The running speed can be detected by the number of revolution of the vane wheel rotated by the resistance of water as the bike travels.

However, water weeds and sea weeds floating on the water surface are likely to entangle with the vane wheel while it rotates at a high speed in water, and to disable the vane wheel from rotating. Further, floating matters may impinge against the vane wheel and break it.

On the other hand, durability of the vane wheel has not been sufficiently high because it rotates at a high speed.

To correctly measure the speed of the water bike, the sensor unit of the speed meter must be disposed at the position at which relative movement between the water bike and the water surface can smoothly change in proportion to the speed of the water bike.

When the conventional vane wheel type sensor is fitted to the position that satisfies the condition described above, such as the outer bottom surface at the center of the stern, the vane wheel type sensor is fitted in such a posture as to protrude from the fitting position. In consequence, the sensor is likely to impinge against foreign matters and is likely to be broken easily. Therefore, the sensor cannot be fitted to the ideal position as its fitting position is limited.

SUMMARY OF THE INVENTION

It is therefore an object of the present invention to provide a water bike equipped with a speed meter having a construction in which a speed meter sensor of the speed meter can be disposed at a position where the sensor is less likely to be entangled with water weeds and sea weeds and to be broken upon impingement against floating matters.

To accomplish this object, the present invention provides a speed meter sensor for measuring a speed of a water bike on water by the value of electromotive force generated by an electromagnetic induction operation, including a coil for generating a magnetic flux and electrodes disposed at positions vertical to both flowing direction of a fluid and direction of the magnetic flux, and fitted to a submerged portion of the water bike.

DESCRIPTION OF THE EMBODIMENTS

Hereinafter, preferred embodiments of the present invention will be explained with reference to the accompanying drawings.

Figure 1:
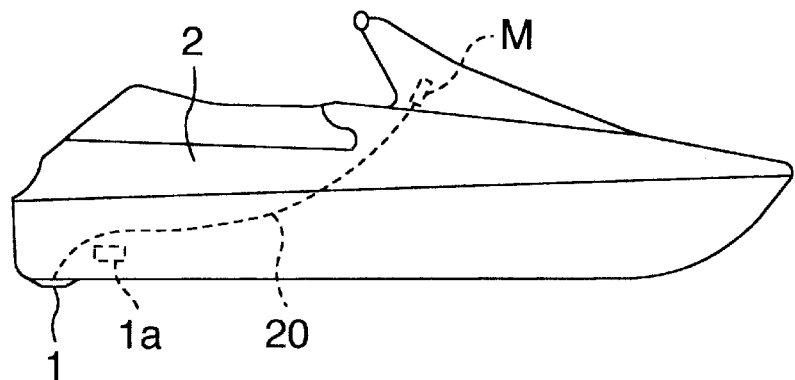
FIG. 1 is a side view of a water bike according to an embodiment of the present invention.

FIG. 1 illustrates a water bike 2 equipped with a speed meter sensor 1 according to the present invention on the bottom of the stern thereof. The speed meter sensor 1 (hereinafter called merely the "sensor") detects a relative speed between the water bike 2 and water, transmits the detection signal to a speed meter M and displays the running speed of the water bike 2 on the speed meter M.

The speed detection principle of this sensor 1 will be explained with reference to FIGS. 2 to 4.

Figure 2:
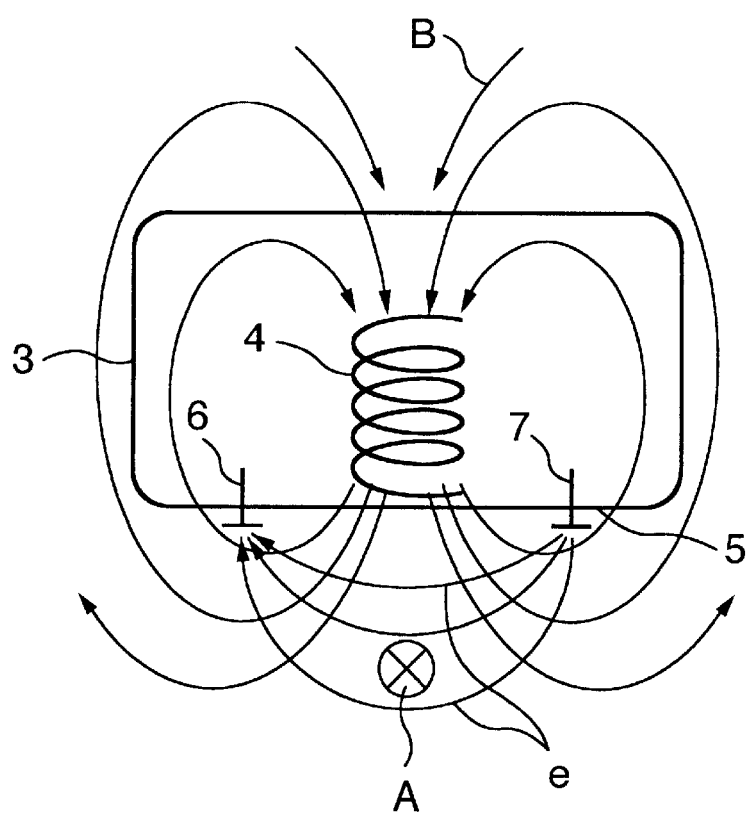
FIG. 2 is an explanatory view useful for explaining the principle of a speed meter sensor according to the present invention.

Referring initially to FIG. 2, reference numeral 3 denotes a sensor case made of a non-magnetic and insulating material. An excitation coil 4 for forming a magnetic flux generating unit is disposed at the center inside the case 3. This coil 4 is disposed under the state where the coil center crosses orthogonally one of the surfaces of the case 3, that is, a to-be-measured surface (outer bottom surface) 5.

A pair of electrodes 6 and 7 is substantially aligned on a line on the measurement surface 5 and on both sides of the excitation coil 4. The sensor is disposed so that a conductive fluid can flow below the measurement surface 5 in a direction A perpendicular to the sheet of the drawing of FIG. 2.

Figure 3:
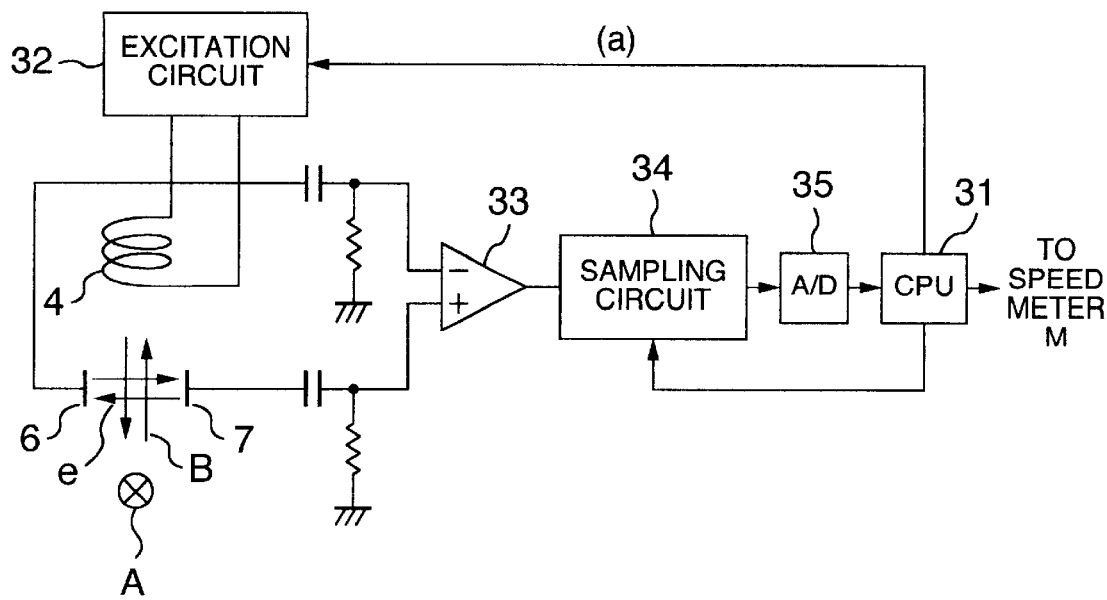
FIG. 3 is a block diagram showing a circuit construction of the speed meter sensor according to the present invention.
Figure 4:
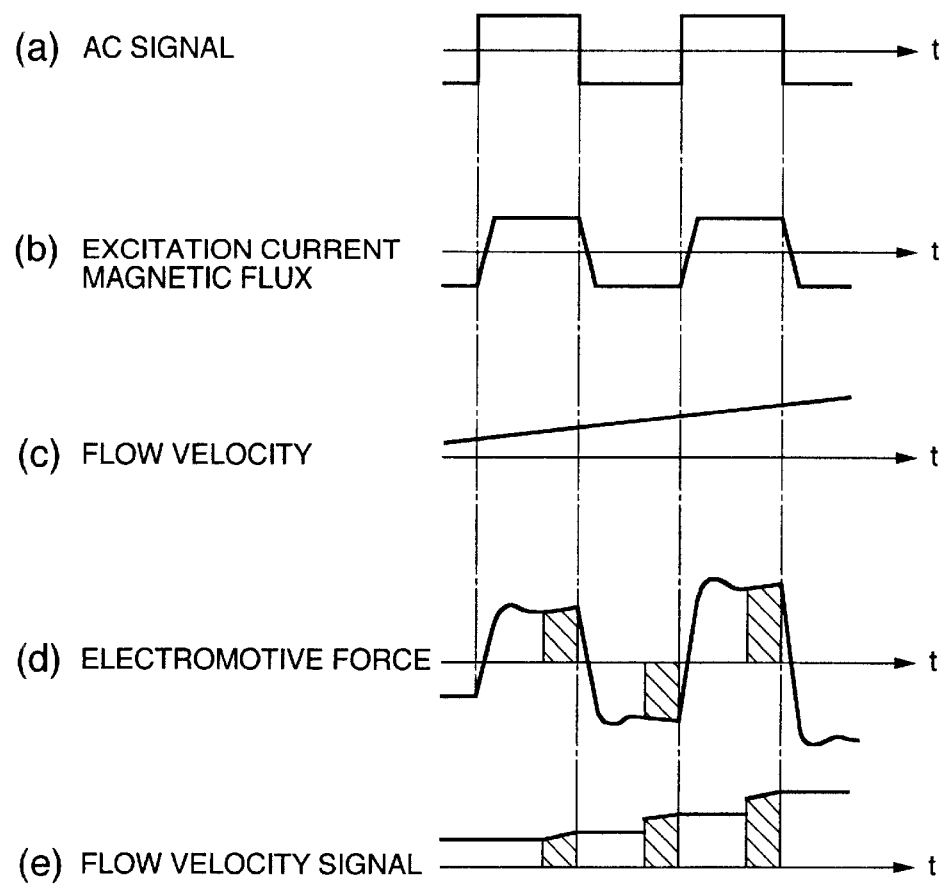
FIG. 4 is a waveform diagram showing the waveforms at the time of measurement on the basis of the principle shown in FIG. 2.

FIG. 3 shows a circuit for detecting the speed of the water bike using the sensor having the construction described above. The principle of the speed detection will be explained with reference to FIGS. 3 and 4.

A CPU 31 supplies an excitation signal having a rectangular wave shown in FIG. 4(a) to an excitation circuit 32. The excitation circuit 32 supplies a voltage of a rectangular wave corresponding to the excitation signal. However, the excitation current shown in FIG. 4(b) flows through the coil with the rise delay and the fall delay resulting from the inductance of the coil, and generates a magnetic flux B proportional to this current. When a fluid flows in the space, in which the magnetic flux exists, in the direction A perpendicular to the sheet of the drawing, an electromotive force e is generated in accordance with the Fleming's right-hand rule in the direction perpendicular to both fluid flowing direction and direction of the magnetic flux, that is, in a direction that connects the electrodes 6 and 7 to each other. In consequence, a voltage proportional to this electromotive force e is detected at the output of a differential amplifier 33 through the electrodes 6 and 7. This electromotive force e can be expressed as follows:

$$E = kBv$$

If the magnetic flux B remains constant, the electromotive force e is proportional to the fluid velocity v. Here, symbol k represents the constant that is determined by the shape of the sensor.

When the flow velocity changes with the lapse of time as shown in FIG. 4(c), the output of the differential amplifier 33 is given by the product of the waveform signal shown in FIG. 4(b) and the waveform signal shown in FIG. 4(c). This output exhibits the waveform shown in FIG. 4(d). Incidentally, the over-shoot at the rise and the fall shown in FIG. 4(d) is generated by inductive transient phenomenon of the magnetic flux linking to the closed loop formed by a space between the electrodes 6 and 7 and the electric circuit. To detect the output of the differential amplifier as the flow rate signal, sampling is preferably made at the portion subsequent to the finish of this transient phenomenon indicated by oblique lines in FIG. 4(d) to avoid the detection error.

The flow velocity signal detected at the output of the differential amplifier 33 is sampled by a sampling circuit 34 at the portions indicated by the oblique lines in FIG. 4(d) and is detected as the signal shown in FIG. 4(e). This signal is then converted from the analog signal to the digital signal by an A/D converter 35 and then to a speed signal by the CPU 31, is sent to the speed meter M, and is displayed as the running speed.

The sensor 1 is fitted to the outer bottom surface of the water bike 2. When the water bike 2 is operated, then the detected voltage is proportional to the relative speed between the water bike 2 and water as the conductive fluid, and the speed of the water bike 2 relative to water can be detected.

Figure 5:
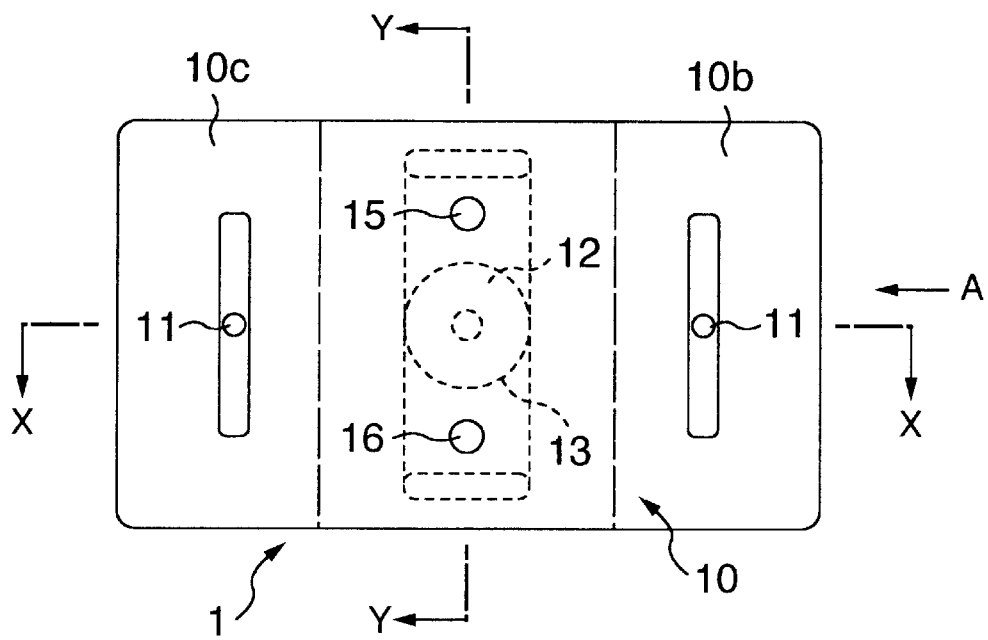
FIG. 5 is a bottom view showing the speed meter sensor according to the first embodiment of the present invention.

Next, the sensor according to the first embodiment of the present invention for detecting the speed on the basis of the principle described above will be explained with reference to FIGS. 5 to 7.

A case 10 is molded from an insulating material such as a polyacetal resin, and is fixed to the outer bottom surface of the water bike 2 by fitting screws 11. The bottom surface of the case 10 is shaped so that its center portion 10a is substantially planar along the outer bottom surface. Slopes 10b and 10c are so defined as to incline from the center portion 10a towards the bow C and the stern D, respectively. Incidentally, the slope may be formed on only the bow side 10b.

A magnetic flux generating unit having the excitation coil 12 and magnetic poles 14a and 14b of an iron core at both ends of the excitation coil 12 is disposed inside the case 10. The excitation coil 12 is disposed at the internal center of the case 10. One 13 of the magnetic poles is disposed in the proximity of the bottom surface of the case 10, that is, a measuring surface 10d. A pair of electrodes 15 and 16 is aligned on a line crossing substantially orthogonally the center axis of the excitation coil 12 (one of the magnetic poles 13) in such a fashion as to interpose the excitation coil 12 between them. These electrodes 15 and 16 are arranged inside the case 10 so that their electrode surfaces are exposed on the side of the measuring surface 10d. Both electrodes 15 and 16 are fixed to the case 10 by nuts 18 through insulating packing 17 and 17a to insure water-tightness inside the case 10. Furthermore, the case 10 accommodates therein an electronic circuit portion 19 shown in FIG. 3. The electronic circuit portion 19 comprises an excitation circuit for exciting the excitation coil 12 and a conversion circuit for converting the voltage across both electrodes 15 and 16 to a signal proportional to the flow rate.

An output signal line 20 is taken out from the electronic circuit portion 19. The distal end of the output signal line 20 is connected to the speed meter (display) M so that the speed can be displayed by LCD or pointer system on the speed meter (display) M by the output signal from the electronic circuit portion 19. A power supply source is connected to the electronic circuit portion 19. Furthermore, a packing material 30 such as a silicone epoxy resin is packed into the case 10 to keep water-tightness.

Figure 6:
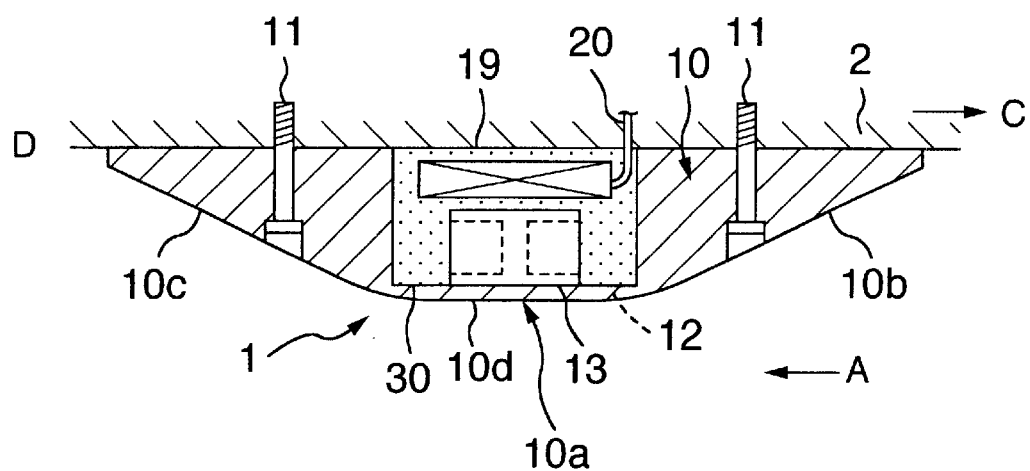
FIG. 6 is a sectional view taken along a line X—X in FIG. 5.

When the water bike 2 having the construction described above runs on water, water flows relatively in the direction A to the running direction C of the water bike 2 in FIG. 6. Electromotive force is generated between the electrodes 15 and 16 by the magnetic flux generated by water, the magnetic pole 13 and the magnetic pole 14a or 14b in proportion to the running speed of the water bike 2. Therefore, the speed of the water bike 2 can be displayed by detecting this electromotive force.

Since the slopes 10b and 10c are formed on the case 10, the case 10 and water flow smoothly relative to each other, and speed measurement can be made with high accuracy.

The sensor 1 described above is fitted to the submerged portion of the water bike 2. The sensor 1 may be fitted to the outer bottom surface at the center in the proximity of the stern of the water bike 2 as indicated by a solid line in FIG. 1 or at the submerged side portion of the hull as indicated by a dash line 1a. Particularly when the sensor 1 is disposed on the bottom surface of the stern, the speed can be measured when the water bike 2 runs at a high speed with its bow kept high afloat.

Incidentally, the electrodes 15 and 16 may be molded from a conductive resin containing carbon, or the like. In this case, the case is made of the insulating resin, and the electrodes 15 and 16 are made of the conductive resin and may be molded integrally with the case 10.

Figure 8:
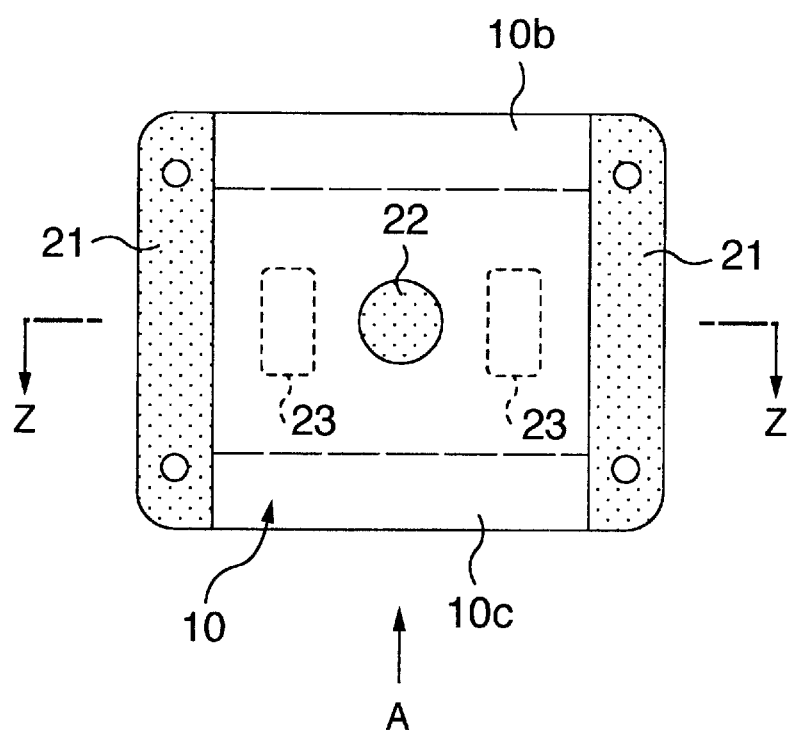
FIG. 8 is a bottom view showing the speed meter sensor according to the second embodiment of the present invention.
Figure 9:
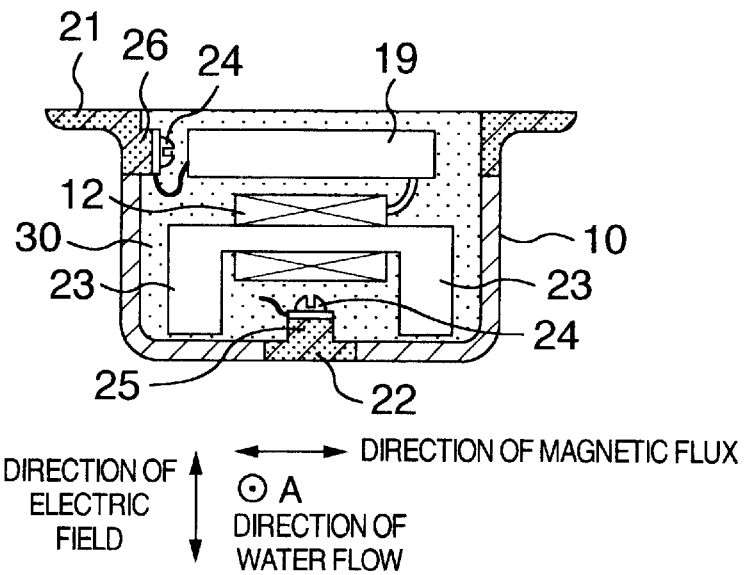
FIG. 9 is a sectional view taken along a line Z—Z in FIG. 8.
Figure 10:
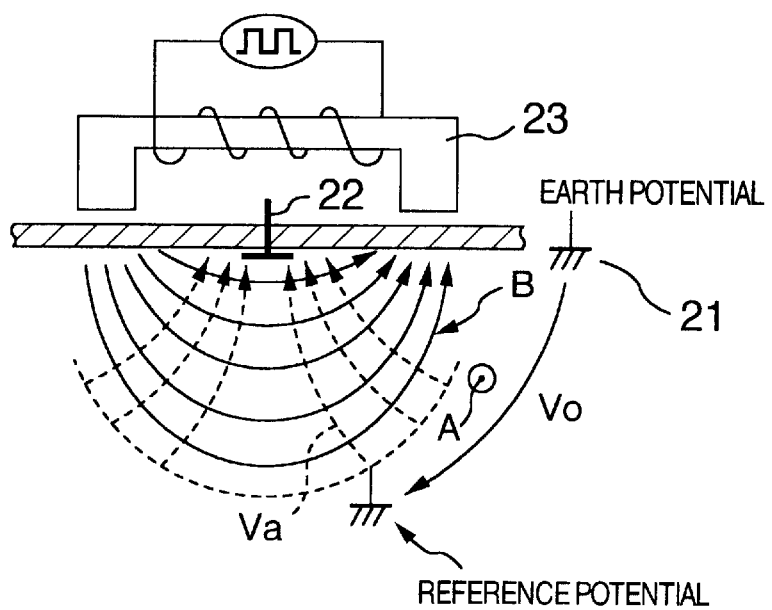
FIG. 10 is an explanatory view useful for explaining the principle of the embodiment shown in FIGS. 8 and 9.

FIGS. 8 to 10 show the sensor according to the second embodiment.

The second embodiment employs the construction in which a part of the case 10 is used as the earth 21 and only one electrode 22 is used. The earth 21 and the electrode 22 are made of a conductive resin containing carbon, or the like, such as a carbon-incorporating polyacetal resin. The other part of the case 10 is made of an insulating resin material, such as a polyacetal resin. The earth 21 and the electrode 22 are molded integrally with the case 10.

A signal occurring between the earth 21 and the electrode 22 is detected to obtain a flow rate signal. To detect the voltage generated, the electrode 22 is disposed preferably so that the center axis of the electrode 22 is in mutually perpendicular directions to the direction of the magnetic flux and to the flowing direction. In this embodiment, the magnetic flux is generated by a yoke 23 so that the direction of the magnetic flux is perpendicular to the direction of the axis of the electrode 22 and to the flowing direction A. Seats 25 and 26, to which tapping screws 24 are fitted, are formed inside the case 10 in such a fashion as to correspond to the electrode 22 and the earth 21, respevctively. The signal line from the electronic circuit 19 is fixed to the seats 25 and 26 by the tapping screws 24 to establish electric connection.

Speed detection by the second embodiment will be explained.

Figure 11A:
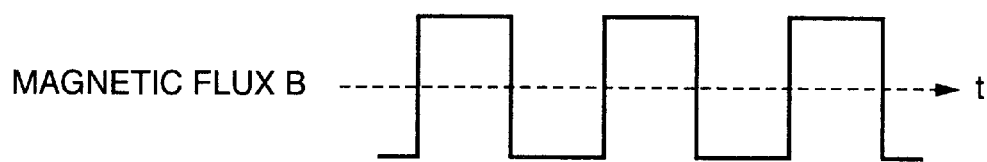
FIGS. 11A and 11B are waveform diagrams showing the waveforms in FIG. 10.
Figure 11B:
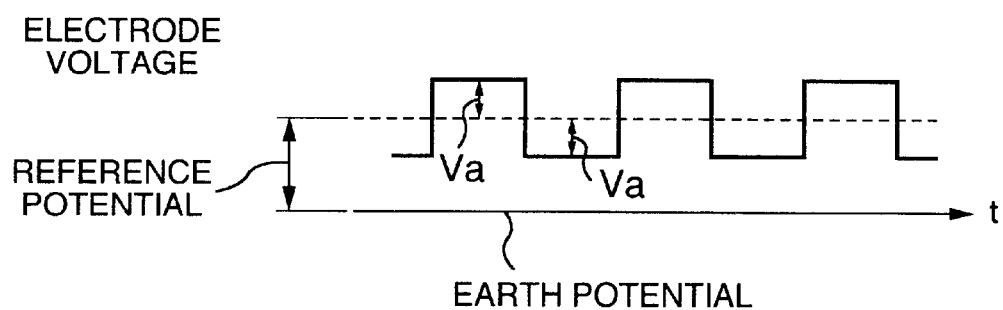

It will be assumed hereby that a virtual reference potential of Vo exists from the earth potential as shown in FIG. 10. It will be assumed further that a magnetic flux B exists and the flow A lows from the back to the front sheet side. Then, a voltage +Va in a + direction occurs from the reference potential Vo. As shown in FIG. 11A, on the other hand, when the polarity N-S of the flux B reverses, the voltage changes to the voltage in the + direction towards the reference potential. Therefore, the electrode potential is equivalent to the voltage −Va when viewed from the reference potential Vo. The electrode voltage changes to Vo+Va or Vo−Va as viewed from the earth potential whenever the flux reverses, as shown in FIG. 11B. Therefore, when this difference is measured, the value proportional to the flow rate can be acquired as Vo+Va−(Vo−Va)=2 Va irrelevantly to the value of Vo.

Figure 12:
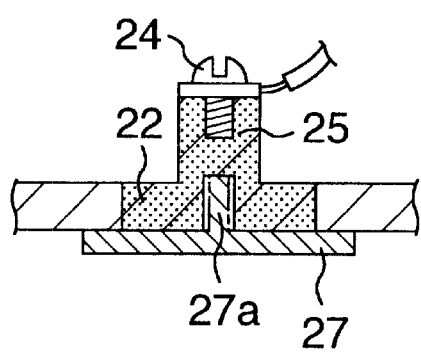
FIG. 12 is a sectional view showing the third embodiment of the present invention.

FIG. 12 shows the third embodiment.

The third embodiment provides the structure of the electrode portion in which a metal electrode 27 is fixed by a screw 27a to the electrode 22 described above to stabilize the output.

Figure 7:
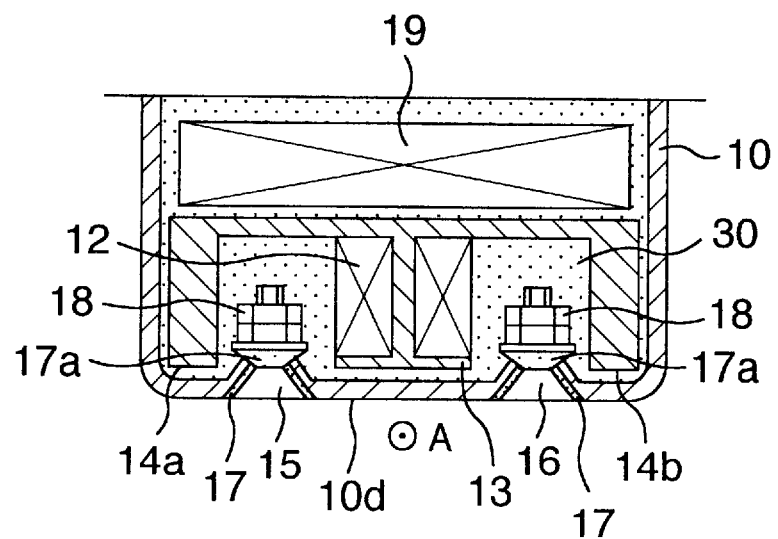
FIG. 7 is a sectional view taken along a line Y—Y in FIG. 5.

In the electrode 22 molded from the carbon-incorporating resin (inclusive of the case where the electrodes 15 and 16 shown in FIG. 7 are molded from the carbon-incorporating resin, too), the content of the conductive filler is at most 20 to 30%. Therefore, the impedance between the electrodes or between the electrode and the earth is 10 to 100 times the impedance of electrodes made of a metal. When the impedance is high, the noise superposed with the fluid signal becomes great as much. Therefore, unstable fluctuation of the flow signal becomes great, too. Since the metal electrode 27 is disposed as described above, the impedance can be lowered, with the result the signal can be stabilized by reducing the disturbance noise and the fluid noise. Particularly when only one electrode 22 is used as shown in FIGS. 8 and 9, the effect is great because the noise is more likely to overlap with the potential ranging from the earth potential to the virtual zero potential if the impedance is high.

Figure 13:
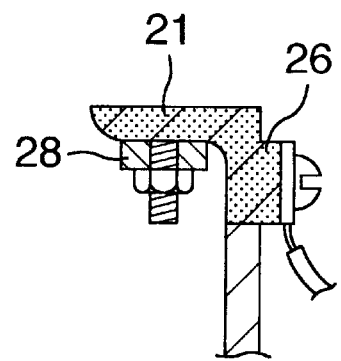
FIG. 13 is a sectional view showing the fourth embodiment of the present invention.

FIG. 13 shows the fourth embodiment. A metal earth 28 is screwed into the earth 21 described above to stabilize the signal.

When the metal electrode 27 and the metal earth 28 are additionally provided, the following effects can be obtained.

When the sensor is used in water (particularly in sea water) for a long period of time, insulating matters adhere to the surfaces of the electrodes and the earth, so that the signal cannot be detected or the electrodes are corroded. In consequence, the sensor must be exchanged as a whole in such a case. If the metal electrode 27 and the metal earth 28 are provided detachably as described above, the repair work can be carried out by exchanging only the metal electrode 27 and the metal earth 28. Thus the maintenance factor can be improved.

Incidentally, the electrodes 15 and 16 of the first embodiment (shown in FIG. 7) may be modified to the structure shown in FIG. 12, too.

Furthermore, the case 10 may be buried into the bottom so that its measuring surface 10d is positioned in the same level as the outer bottom surface of the hull.

As described above, the speed sensor according to the present invention does not have the rotating portion that is driven and rotated by the water stream as required in the prior art. Therefore, the present invention is free from the problem that water weeds and sea weeds floating on the water surface or sea surface do not entangle with the conventional vane wheel. The present invention is also free from the problem of breakdown due to impingement of foreign matters. Because the present invention does not have the rotating portion, durability can be improved.

The electromagnetic sensor of the speed meter according to the present invention does not have a movable portion but can take a solid structure having a high strength. The electrode portions detect the signal and can be brought into the same level as the bottom. Therefore, the sensor is free from the limitation of the fitting position and can be fitted to the ideal position.

The signal voltage of the electrode portion of this electromagnetic sensor has the proportional relationship with the relative speed between the water bike 1 and the water surface. Therefore, the electromagnetic sensor can measure the speed of the water bike more accurately than the conventional vane wheel type sensors.

What is claimed is:

1. A water bike equipped with a speed meter comprising:
 a coil disposed to generate in water a magnetic flux in at least a direction crossing orthogonally a running direction of said water bike;
 a current source for supplying a current for generating the magnetic flux in said coil;
 electrodes having threads for supporting a flat metallic portion which contacts the water for detecting electromotive force generated in water by an electromagnetic induction operation occurring between said magnetic flux and water during running of said water bike;
 computing means for determining the speed of said water bike on the basis of the signal detected by said electrodes; and
 display means for displaying the speed so determined.

2. A water bike according to claim 1, wherein said coil is disposed on the bottom surface of the stem of said water bike.

3. A water bike according to claim 1, wherein said coil is equipped with a core, and at least one of magnetic poles of said core is disposed in such a fashion that the center axis thereof is substantially vertical to the bottom surface of the hull.

4. A water bike according to claim 1, wherein said electrodes are disposed on both sides of said coil in the running direction of said water bike in such a fashion as to interpose said coil between them and to come into contact with water.

5. A water bike according to claim 1, wherein at least a part of said electrodes is formed of an electrically conductive resin.

6. A water bike according to claim 1, wherein said coil, said electrodes and said computing means are accommodated in an insulating resin case and are integrally constituted, and said electrodes are so disposed as to come into contact with water.

7. A water bike according to claim 1, wherein said coil includes a core, and a pair of magnetic poles of said core is disposed on both right and left sides of the running direction of said water bike in such a fashion that the center axes thereof are substantially vertical to the bottom surface of the hull.

8. A water bike according to claim 7, wherein one of said electrodes is disposed at the center of the pair of said magnetic poles.

9. A water bike according to claim 1, wherein said power source supplies an alternating current.

10. A water bike according to claim 9, wherein said computing means includes means for sampling the signals detected by said electrodes and converting them to speed signals.

11. A water bike according to claim 9, wherein said computing means includes a sampling circuit for sampling the signal detected by said electrodes in synchronism with reversion of the magnetic flux generated by said alternating current, an A/D converter for converting said sampled signal from an analog signal to a digital signal, and means for computing said speed on the basis of the difference of the sampling signals between the case where the magnetic flux is generated before reversion and the case where the magnetic flux is generated after reversion.

12. A water bike equipped with a speed meter comprising:

a coil including a core and a pair of magnetic poles disposed in a line perpendicular to an axes of said water bike;

said coil being so disposed as to generate in water a magnetic flux in at least a direction crossing orthogonally a running direction of said water bike;

a current source for supplying a current for generating the magnetic flux in said coil;

electrodes for detecting electromotive force generated in water by an electromagnetic induction operation occurring between said magnetic flux and water during running of said water bike, one of said electrodes being located between said pair of magnetic poles, and separated from the other electrode by one of said magnetic poles;

computing means for determining the speed of said water bike on the basis of the signal detected by said electrodes; and display means for displaying the speed so determined.

13. A water bike equipped with a speed meter comprising:

a coil so disposed as to generate in water a magnetic flux in at least a direction crossing orthogonally a running direction of said water bike;

a current source for supplying a current for generating the magnetic flux in said coil;

electrodes having flat metallic members fixed thereto with nuts and bolts for detecting electromotive force generated in water by an electromagnetic induction operation occurring between said magnetic flux and water during running of said water bike;

computing means for determining the speed of said water bike on the basis of the signal detected by said electrodes; and display means for displaying the speed so determined.

* * * * *